(12) United States Patent
Suo et al.

(10) Patent No.: US 8,213,345 B2
(45) Date of Patent: Jul. 3, 2012

(54) TRANSMISSION METHOD AND APPARATUS FOR UPLINK CONTROL SIGNALING IN TIME DIVISION OFDMA SYSTEM

(75) Inventors: Shiqiang Suo, Beijing (CN); Guojun Xiao, Beijing (CN); Ruiqi Zhang, Beijing (CN)

(73) Assignee: China Academy of Telecommunications Technology, Beijing (CN)

( * ) Notice: Subject to any disclaimer, the term of this patent is extended or adjusted under 35 U.S.C. 154(b) by 123 days.

(21) Appl. No.: 12/532,271

(22) PCT Filed: Mar. 21, 2008

(86) PCT No.: PCT/CN2008/070565
§ 371 (c)(1),
(2), (4) Date: Feb. 12, 2010

(87) PCT Pub. No.: WO2008/113301
PCT Pub. Date: Sep. 25, 2008

(65) Prior Publication Data
US 2010/0177669 A1 Jul. 15, 2010

(30) Foreign Application Priority Data
Mar. 21, 2007 (CN) .......................... 2007 1 0064598

(51) Int. Cl.
H04J 3/00 (2006.01)
H04J 3/24 (2006.01)
H04J 3/16 (2006.01)
H04W 4/00 (2009.01)
H04W 36/00 (2009.01)
H04W 72/00 (2009.01)

(52) U.S. Cl. ........ 370/280; 370/329; 370/349; 370/468; 455/436; 455/450

(58) Field of Classification Search .......... 370/208–211; 379/260
See application file for complete search history.

(56) References Cited

U.S. PATENT DOCUMENTS

| 7,995,529 B2 * | 8/2011 | Kauser et al. ................. 370/329 |
| 2004/0014477 A1 * | 1/2004 | Ishiguro et al. ............... 455/450 |
| 2004/0097231 A1 * | 5/2004 | Marque-Pucheu ........... 455/436 |
| 2004/0114618 A1 * | 6/2004 | Tong et al. .................... 370/431 |
| 2005/0025093 A1 * | 2/2005 | Yun et al. ..................... 370/328 |
| 2005/0243745 A1 * | 11/2005 | Stanwood et al. ............ 370/280 |
| 2006/0035643 A1 * | 2/2006 | Vook et al. .................... 455/450 |
| 2006/0262768 A1 * | 11/2006 | Putzolu ......................... 370/344 |
| 2006/0274679 A1 * | 12/2006 | Khandekar et al. ........... 370/278 |
| 2006/0280142 A1 * | 12/2006 | Damnjanovic et al. ....... 370/329 |
| 2007/0104085 A1 * | 5/2007 | Sambhwani et al. .......... 370/203 |

* cited by examiner

*Primary Examiner* — Brandon Renner
(74) *Attorney, Agent, or Firm* — Hoffmann & Baron, LLP

(57) ABSTRACT

A method and an apparatus for an uplink control signaling transmission in a time division duplex OFDMA system are provided for the long term evolution time division duplex (LTE TDD). A signaling processing unit reserves frequency resource for an uplink control channel according to the total amount of the uplink control signaling, and the reserved frequency resource are assigned on both sides of the frequency domain used by uplink time slots, so that the uplink control signaling of a terminal UE is transmitted on the position and the bandwidth of the reserved frequency resource. The transmitted uplink control signaling is transmitted on respective reserved uplink control sub-channels by an intra-subframe hopping way, each terminal UE or a group of UEs corresponding to a frequency-hop sequence. The present invention is simple to realizes and capable of utilizing resource repeatedly and utilizing the time domain and frequency domain diversity simultaneously.

18 Claims, 10 Drawing Sheets

TRANSMISSION METHOD AND APPARATUS FOR UPLINK CONTROL SIGNALING IN TIME DIVISION OFDMA SYSTEM

TECHNICAL FIELD

The present invention relates to mobile communication accessing technology, more particularly to a method and an apparatus for uplink control signaling transmission in a time division duplex (TDD) orthogonal frequency division multiple access (OFDMA) system.

BACKGROUND ART

The third generation of communication system (3G) with code division multiple access (CDMA) technique, in which multimedia services is well supported, will be highly competitive for several years. However, in order to ensure competitiveness in a longer time, the 3GPP starts the research project of long-term evolution (LTE) of 3G radio-access technology. The main targets of LTE project are reduction of the time delay, enhancement of user data rate, improvement of the capacity and the coverage, and reduction of the operator's cost.

According to the progression of the research, two types of frame structures are supported: Generic frame structure and Alternative frame structure. The Generic frame structure supports both frequency division duplex (FDD) and TDD systems; and the Alternative frame structure supports TDD systems only.

The Generic frame structure is shown in FIG. 1: one 10 ms length radio frame consists of 20 time slots (TS), indexed from #0 to #19, each TS length is 0.5 ms, and a subframe is defined as two contiguous TS.

The Alternative frame structure is shown in FIG. 2: a 10 ms length radio frame is divided into two 5 ms half-frames, each half-frame consists of 7 service time slots TS0~TS6, which correspond to #0 to #6 in FIG. 2, and three special time slots DwPTS, UpPTS, and GP. One service time slot is also called a Transmission Time Interval (TTI) or a sub-frame, an UL/DL switch-point is set between TS3 (#3) and TS4 (#4) as shown in FIG. 2. The service time slot is used for data and control signaling transmission, the downlink special time slot (DwPTS) is used for transmitting downlink synchronization information of the system, the uplink pilot time slot (UpPTS) is used for uplink random accessing, and the switch protection time slot (GP) is used for providing time interval, during which the downlink transmission time slot is switched to the uplink transmission time slot.

The length of TTI of LTE TDD is a length of a service time slot, viz. 0.675 ms. A service time slot is consisted of 9 or 8 orthogonal frequency division multiplexing (OFDM) symbols, which respectively correspond to cyclic prefixes (CP) of different lengths. FIG. 3 provides a structure of the service time slot in the case of short CP: a service time slot is consisted of 2 short blocks (SB) and 8 long blocks (LB), SB is usually used for transmitting a reference symbol (or called "pilot symbol"), such assignation can reduce the resource used by the reference symbol. Each service time slot can be used for uplink or downlink data transmission, generally a structure in which each half-frame has only one UL/DL switch-point is adopted, and the uplink-to-downlink data transmission ratio can be adjusted flexibly by adjusting the position of the UL/DL switch-point, in order to meet different application requirements.

Among the three international standards of 3G, TD-SCDMA is the only one that supports TDD. TD-SCDMA can be flexibly assigned to match the asymmetric uplink and downlink service. And with the advanced wireless communication technologies, such as smart antenna, uplink synchronization, joint detection, and software radio etc., the TD-SCDMA system can achieve comparative high performance and spectrum efficiency. In order to keep the competitiveness of TD-SCDMA system for a long term, the TD-SCDMA system needs to continuously develop and improve the performance as well. In the long-term evolution projection LTE TDD of TD-SCDMA, the alternative frame structure is highly preferred for the compatibility with the TD-SCDMA system as shown in FIG. 2.

In the modern digital communication system, the design of control signaling has large influence on the performance of the system. The uplink control signaling can be divided into two kinds: data associated control signaling and non-data associated control signaling. The data associated control signaling is the information used for processing uplink package, such as the modulation/coding scheme (MCS), new data indication (NDI), multi-antenna mode (MIMO mode) etc. The non-data associated control signaling mainly includes downlink channel quality indication (CQI) for scheduling or link adaptation and acknowledge (ACK) of the downlink package etc.

For LTE system, including both LTE FDD and LTE TDD, since the system transmission parameters are determined by NodeB, i.e. the user equipment (UE) transmits the uplink data based on the parameter indicated by downlink control signaling from the NodeB, so only the non-data associated control signaling needs to be transmitted. The uplink control signaling of LTE TDD mainly includes downlink channel quality indication (CQI) and acknowledges signal (ACK/NACK), and the LTE FDD system further needs to transmit codebook information of pre-coding matrix.

The agreed basic transmission characteristics of the uplink control signaling for both LTE FDD and LTE TDD are:
1) the control signaling and data are multiplexed before operation of Discrete Fourier Transform (DFT), when UE transmits data and control signaling simultaneously;
2) the control signaling is transmitted on the reserved frequency resource, when UE only need uplink-transmit uplink control signaling.

The key for realizing the above mentioned transmission solution of uplink control signaling is to design the control channel without uplink data transmission.

A relative concrete designing solution of control channel without uplink data of LTE FDD is shown in FIG. 4, wherein the lateral direction represents frequency domain (Frequency), the longitudinal direction represents time domain (Time), 1 indicates frequency-hop sequence 1, 2 indicates frequency-hop sequence 2, 3 indicates frequency-hop sequence 3, 4 indicates frequency-hop sequence 4, 5 indicates data, and 6 indicates non-data associated signaling transmitted together with the data 5. The frequency-hop sequence 1, frequency-hop sequence 2, frequency-hop sequence 3, and frequency-hop sequence 4 are non-data associated control signaling individually transmitted. An uplink control signaling dedicated frequency resource of fixed size is reserved in each uplink time slot, the individually transmitted non-data associated control signaling is transmitted in the reserved area at both sides of the frequency domain by a frequency hopping way. Since each sub-frame reserves frequency resource for uplink control signaling transmission, the control signaling can obtain diversities in time and frequency simultaneously, so that the reliability of the control signaling is improved.

For LTE TDD, there is still no feasible solution for the control channel without uplink data.

The difference between TDD duplex mode and FDD duplex mode causes the transmission mode of control signaling in TDD system to be different from that in FDD system, particularly shown as the followings:

First, since the Alternative frame structure adopted in TDD system has a time division structure, in which the uplink-to-downlink time slot ratio is variable, this renders: 1) change of the total amount of the uplink control signaling; 2) change of available uplink resource. Hence, if the LTE FDD solution shown in FIG. 3 is adopted, each uplink time slot reserves uplink control signaling dedicated frequency resource of fixed size, which will render resource waste.

Second, in Generic frame structure, a sub-frame is consisted of two time slots, which can easily improve the performance of the control channel by frequency hopping in units of time slots; however, in Alternative frame structure, each sub-frame is consisted of one service time slot, so each sub-frame has to be divided to realize frequency hopping.

Third, according to the control signaling, TDD is also distinguished from FDD. For instance, FDD system adopts codebook based pre-coding, wherein the uplink control signaling needs to feedback codebook index, while TDD system adopts non-codebook based pre-coding, and does not need to feedback associated pre-coding matrix information. This will be reflected on the difference of the number of the uplink control signaling and of the resource used by the uplink control channels.

Owing to the above, with the development of the present LTE standard, the uplink control signaling of FDD duplex mode preferably transmitted in each sub-frame (1 ms) consisted of two time slots. When the user needs to transmit uplink data and control signaling, the control signaling and data are multiplexed before DFT; when the user only transmits control signaling, the control signaling is transmitted on the reserved frequency resource. For the LTE TDD system adopting Alternative frame structure compatible with TD-SCDMA, the uplink control channel has to be designed in consideration of its frame structure and duplex characteristics, so as to ensure the reliability of control signaling, save resource, perform flexible assignation and so on. However, at present, there is no solution for uplink control channel transmission in consideration of the characteristics of LTE TDD system, i.e., there is no feasible solution of the control channel without uplink data.

SUMMARY OF THE INVENTION

In consideration of the above mentioned, the main object of the present invention is to provide a method and an apparatus for uplink control signaling transmission in a time division duplex OFDMA system, and to provide a method for transmitting uplink control signaling for LTE TDD system adopting Alternative frame structure or Generic frame structure.

In order to achieve the above mentioned object, the technical solution of the present invention is carried out as follows:

A method for uplink control signaling transmission in a TDD OFDMA system, e.g. LTE TDD, is provided, and the method comprises the following processing steps:

A. based on total amount of the uplink control signaling and available uplink time slot resource, some frequency resource on both sides of the system bandwidth in frequency domain is reserved for uplink control channel, and the physical uplink control channel is transmitted on the resource reserved;

B. the uplink control signaling is transmitted on the reserved frequency resource by an intra-subframe frequency hopping way, and the signaling of a UE or a group of UEs is transmitted on a frequency-hop sequence.

An apparatus for uplink control signaling transmission in a TDD OFDMA system is provided for individually transmitting non-data associated control signaling in a long term evolution time division duplex LTE TDD system:

The apparatus comprises a control signaling processing unit and a frequency-hop processing unit;

The control signaling processing unit reserves frequency resource for uplink control channels and assigns the reserved frequency resource on both sides of system bandwidth in frequency domain based on the total amount of the uplink control signaling and available uplink time slot resource, so as to form reserved uplink control channels;

The frequency-hop processing unit transmits the uplink control signaling transmitted on the reserved frequency resource of the reserved uplink control channel on the respective reserved uplink control sub-channels by an intra-subframe frequency hopping way, and the signaling of each terminal UE or a group of UEs is transmitted on a frequency-hop sequence.

The characteristics of the technical solution of the present invention include: the time slots and bandwidth in frequency domain used by the reserved frequency resource can be flexibly assigned based on the difference in system operating bandwidth and in uplink-to-downlink time slot ratio; the uplink control signaling is transmitted on the reserved frequency resource by a intra-subframe frequency hopping way. In frequency domain, the reserved frequency resource are assigned symmetrically on both sides of the system operating frequency resource, so as to ensure sufficient utilization of diversity in frequency domain; in time domain, the duration of the reserved frequency resource occupies the entire sub-frame, so as to ensure the duration of each uplink control channel and extend the coverage range.

The advantageous effects of the present invention lie in: based on the characteristics of the time slot of LTE TDD, non-data associated control signaling being transmitted on one uplink time slot is the same as on several uplink time slots, which has no influence on the performance; based on different system operation bandwidths and different positions of UL/DL switching, the positions and bandwidth of the uplink control channel, viz. the reserved frequency resource, is assigned so that not only the resource can be efficiently utilized, but also low complexity of realization is ensured and the unity of uplink control channel on different positions of the switch-points and under different system operating bandwidths is ensured; by dividing the sub-frame, uplink control channel is reserved by a intra-subframe frequency hopping way, meanwhile using diversity in time domain and frequency domain, the performance and reliability of the control channel is improved; for different requirements on service quality and channel conditions, different pilot solutions can be selected to ensure the detection and demodulation performances of the reserved uplink control channel.

The solution of the present invention is designed mainly for LTE TDD system adopting Alternative frame structure and also for LTE TDD system adopting Generic frame structure, and it makes contribution to the long term evolution LTE TDD research project in the aspects of increasing user data rate and improving capacity and coverage of system.

MODE OF CARRYING OUT THE INVENTION

Figure 8:
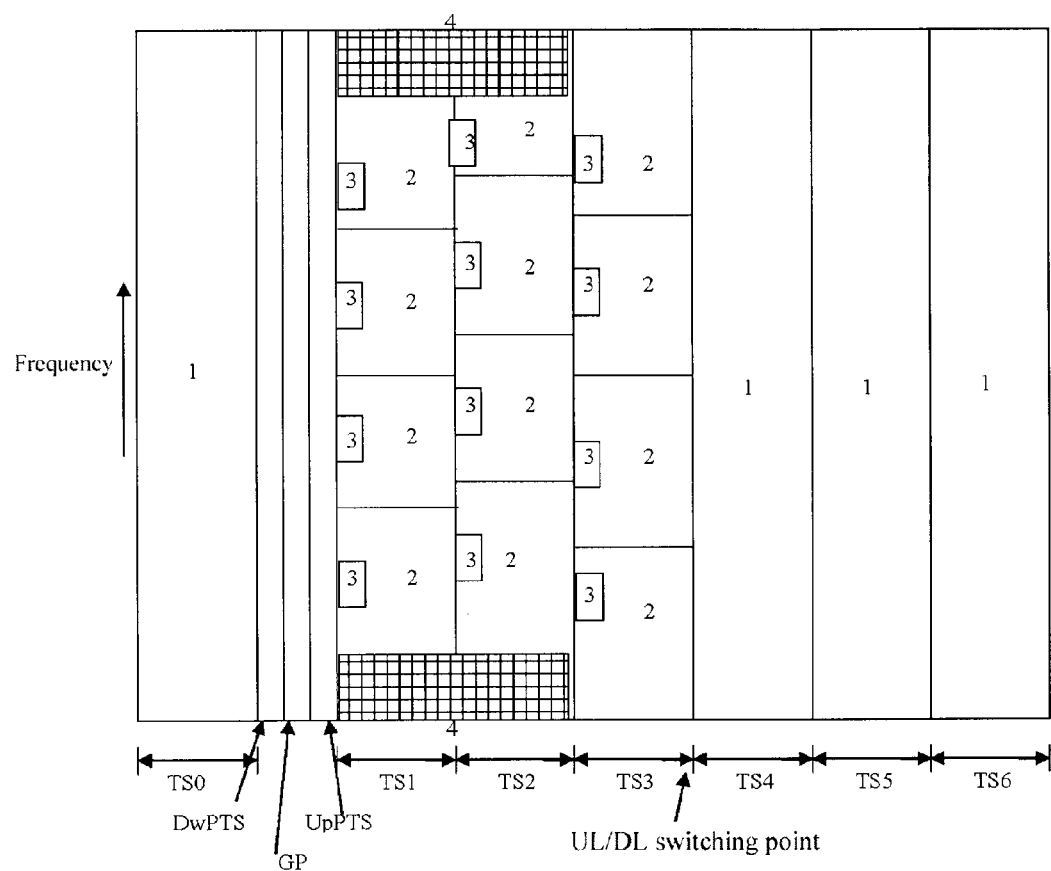
FIG. 8 is a schematic diagram of a fourth transmission solution for non-data associated control signaling transmitted together with data and individually transmitted non-data associated control signaling when the present invention is applied to TDD system adopting Alternative frame structure.
Figure 9:
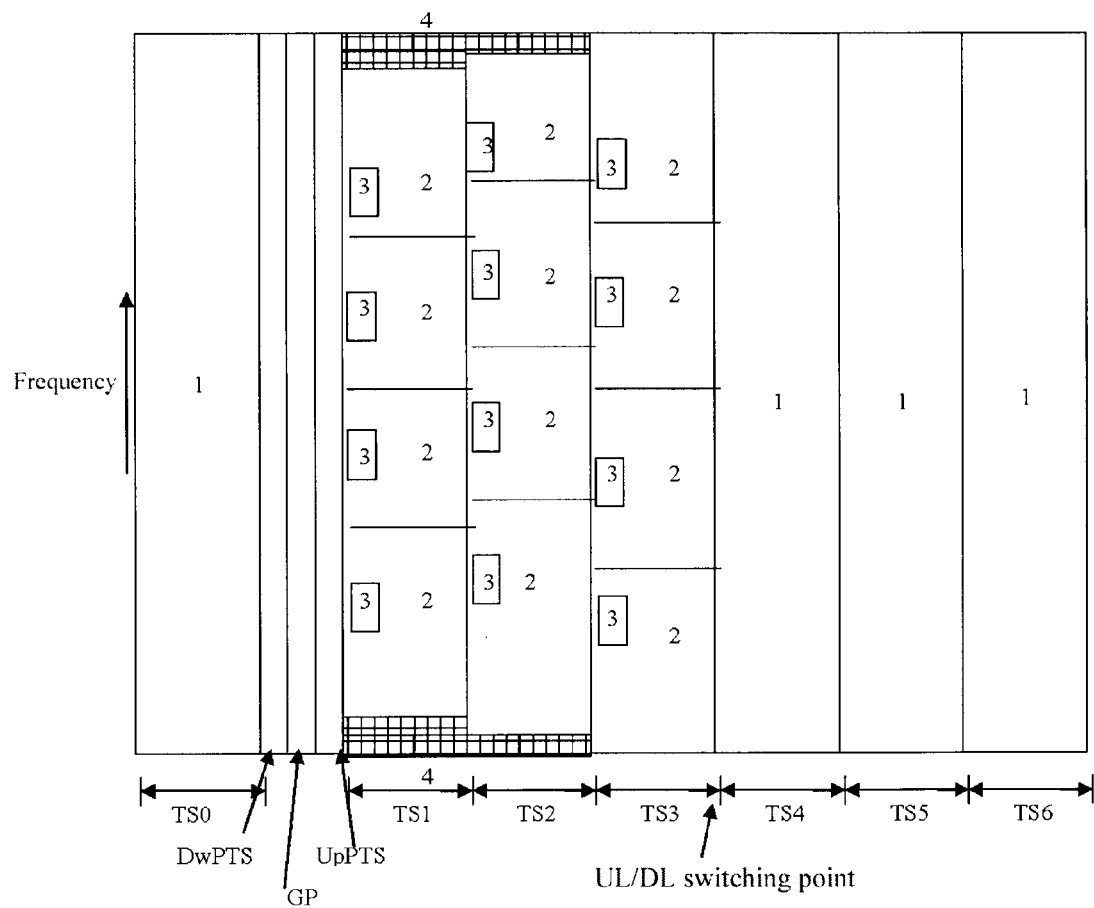
FIG. 9 is a schematic diagram of a fifth transmission solution for non-data associated control signaling transmitted together with data and individually transmitted non-data associated control signaling when the present invention is applied to TDD system adopting Alternative frame structure.
Figure 10:
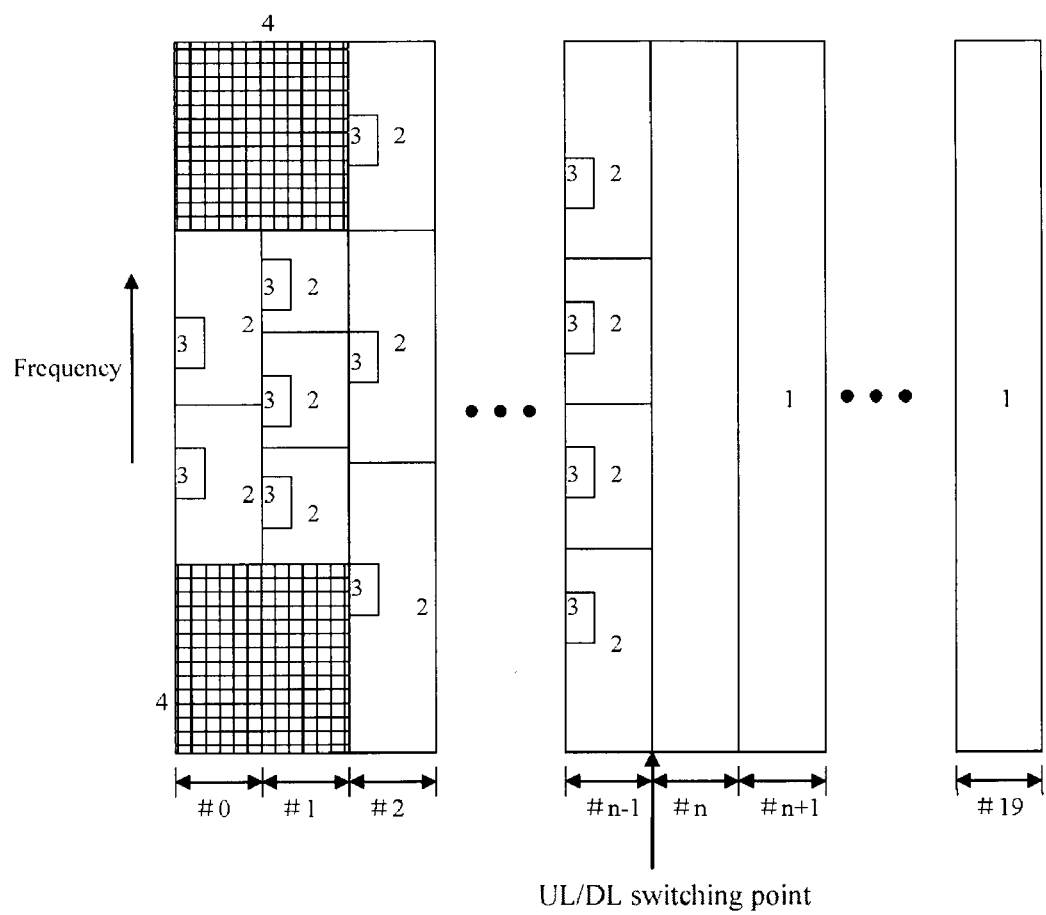
FIG. 10 is a schematic diagram of a transmission solution for non-data associated control signaling transmitted together with data and individually transmitted non-data associated control signaling when the present invention is applied to TDD system adopting Generic frame structure and the solution shown in FIG. 8.

The present invention provides a method and an apparatus for uplink control signaling transmission for LTE TDD system adopting Alternative frame structure or adopting Generic frame structure, especially the LTE TDD system adopting Alternative frame structure. The method and the apparatus transmit non-data associated control signaling individually transmitted. Five transmission solutions of non-data associated control signaling transmitted together with data and individually transmitted non-data associated control signaling in system adopting Alternative frame structure is shown in FIG. 5 to FIG. 9, particularly they are five methods for assigning the reserved frequency resource. These five methods for assigning the reserved frequency resource are also used for the TDD system adopting Generic frame structure, and one example thereof is shown in FIG. 10.

In the present invention, an uplink control channel is reserved by reserving frequency resource, the positions and bandwidths of the reserved frequency resource are variable, which can be assigned flexibly according to different positions of the UL/DL switch-points and different system operating bandwidths. Firstly, the solution of reserving the frequency resource needs to ensure the effectiveness of the resource, which is mainly reflected on the capability of flexibly assigning the reserved resource as required, not only the sufficient utilization of the resource should be ensured, but also the service demand of UE should be satisfied; secondly, the solution should support the reliability of specific uplink channel; at last, the solution should be easy to realize. Thus, the design of reserving frequency resource should have the characteristics including: the positions of uplink time slots and bandwidths in frequency domain used by the reserved frequency resource are assigned according to the system operation bandwidth and the uplink-to-downlink time slot ratio, which is not fixed; the reserved frequency resource are assigned symmetrically on both sides of the system operating frequency resource to ensure sufficient utilization of frequency domain diversity; in order to ensure the duration of each uplink control channel and provide sufficient coverage range, the duration of the reserved frequency resource should occupy the entire time slot where the reserved frequency resource is located.

First, based on parameters such as the number of UEs supported by the system downlink, type of service, representation method of the uplink control signaling, the total amount of the uplink control signaling under different uplink-to-downlink ratio and different system operating bandwidth is estimated by emulation, simulation calculation etc. An estimation result for LTE TDD system adopting Alternative frame structure is shown in Table 1. Table 1 lists a/b in the case that uplink-to-downlink ratio is respectively 1:5, 2:4, 3:3, 4:2, 5:1 and the system operating bandwidth is respectively 1.25M, 2.5M, 5M, 10M, 15M, 20M, wherein a represents resource necessary for transmitting the uplink control signal on the reserved frequency resource, viz. the total amount of the uplink control signaling, and b represents the total amount of the available uplink resource, in unit of PRB. For the LTE TDD system adopting Generic frame structure, corresponding to the uplink-to-downlink ratio and the operating bandwidth of the system, the total amount of the uplink control signaling may also be estimated according to the same principle.

TABLE 1

| UL:DL | 1.25M | 2.5M | 5M | 10M | 15M | 20M |
|---|---|---|---|---|---|---|
| 1:5 | 5/6 | 10/12 | 20/25 | 40/50 | 60/75 | 80/100 |
| 2:4 | 4/12 | 8/24 | 16/50 | 32/100 | 48/150 | 64/200 |
| 3:3 | 3/18 | 6/36 | 12/75 | 24/150 | 36/225 | 48/300 |
| 4:2 | 2/24 | 4/48 | 8100 | 16/200 | 24/300 | 32/400 |
| 5:1 | 1/30 | 2/60 | 4/125 | 8/250 | 12/375 | 16/500 |

Figure 5:
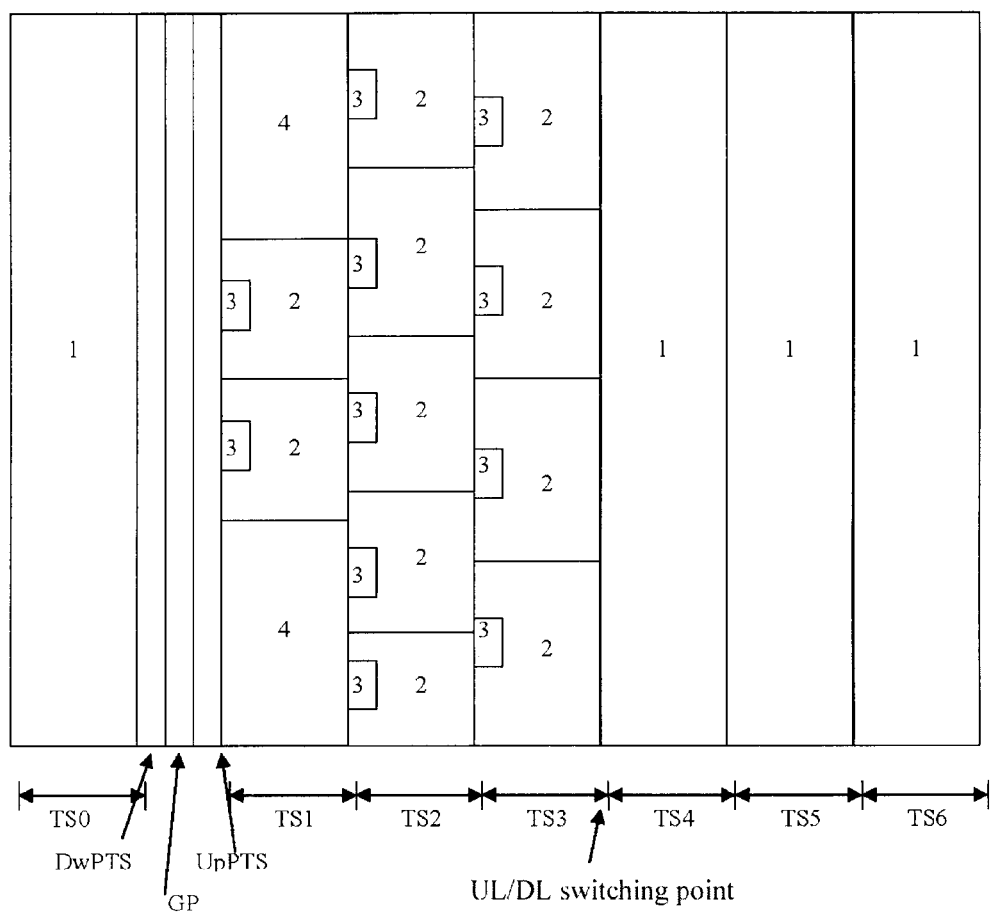
FIG. 5 is a schematic diagram of a first transmission solution for non-data associated control signaling transmitted together with data and individually transmitted non-data associated control signaling when the present invention is applied to TDD system adopting Alternative frame structure.

On the basis of the estimation of the total amount of the uplink control signaling, the specific solution of determining the position and bandwidth of reserved frequency resource is designed as follows:

The first solution of reserving frequency resource: the time domain position of the reserved frequency resource is fixedly assigned on any uplink time slot, for instance, the first uplink time slot is TS1 for the Alternative frame structure, and it is the first uplink time slot for the Generic frame structure, the reserved frequency resource is depended on the system operating bandwidth and the uplink-to-downlink time slot ratio. In the Alternative frame structure is shown in FIG. 5, 1 represents downlink transmission channel, 2 represents uplink data channel, 3 represents non-data associated control signaling multiplex-transmitted together with data, and 4 represents individually transmitted non-data associated control signaling. TS0, TS4, TS5, TS6 are downlink transmission channels, TS1, TS2, TS3 are uplink transmission channels, and UL/DL switch-point is provided between TS3 and TS4.

Suppose that the current uplink-to-downlink time slot ratio is 3:3 and the system operating bandwidth is 10 MHz, it can be learned from Table 1 that the total resource necessary for transmitting the uplink control signaling in the reserved frequency resource, viz. the total amount of the uplink control signaling, is 24 PRB. According to the principle of being fixedly assigned on TS1 and symmetrical and equal assignation, 12 PRB is assigned on each of the both sides (4) of TS1 in the frequency domain for the reserved frequency resource. The non-data associated control signaling (3) multiplex-transmitted together with the uplink data (2) is multiplexed before DFT.

Figure 6:
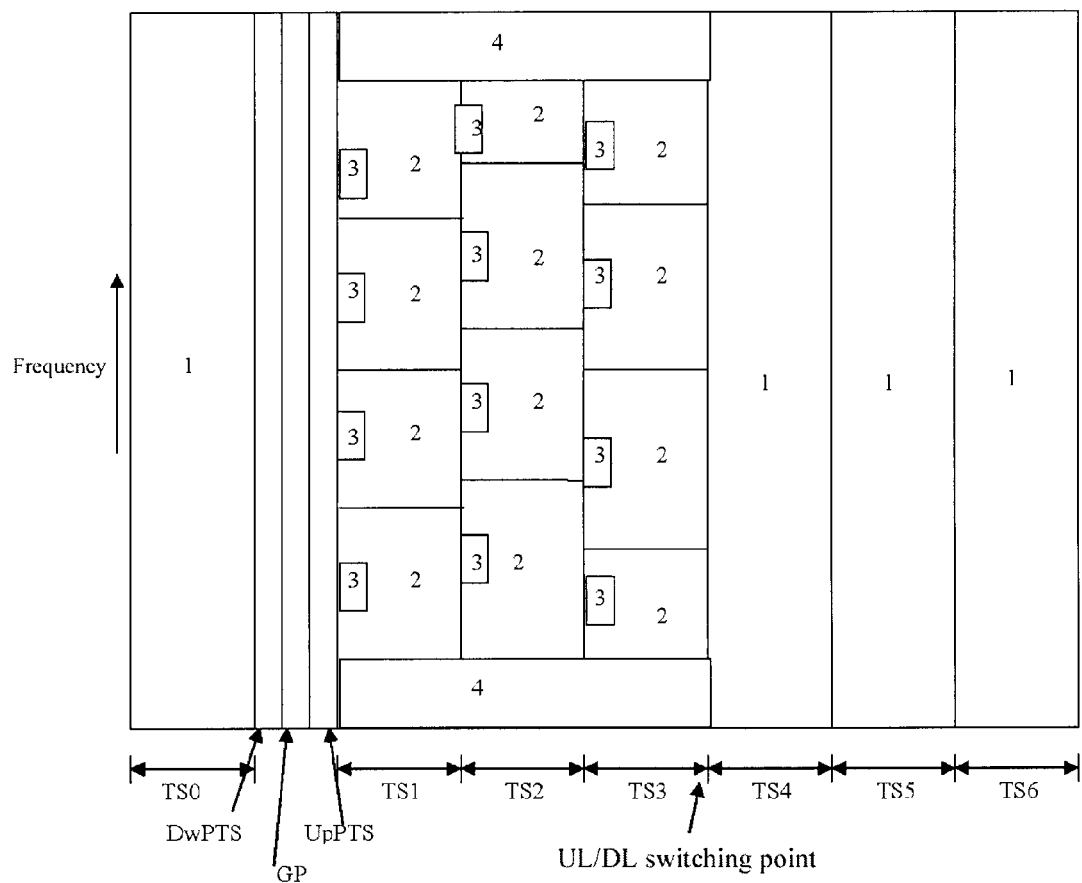
FIG. 6 is a schematic diagram of a second transmission solution for non-data associated control signaling transmitted together with data and individually transmitted non-data associated control signaling when the present invention is applied to TDD system adopting Alternative frame structure.

The second solution of reserving frequency resource: the time domain positions of the reserved frequency resource are fixedly assigned on all the uplink time slots (Alternative frame structure and Generic frame structure), i.e. a frequency resource is reserved in each time slot and the reserved frequency resource of all the time slots have the same bandwidth. The bandwidth of the reserved frequency resource is dependent on the system operating bandwidth and the uplink-to-downlink time slot ratio. In the Alternative frame structure shown in FIG. 6, 1 represents downlink transmission channel, 2 represents uplink data channel, 3 represents non-data associated control signaling multiplex-transmitted together with data, and 4 represents individually transmitted non-data associated control signaling. TS0, TS4, TS5, TS6 are downlink transmission channels, TS1, TS2, TS3 are uplink transmission channels, and UL/DL switch-point is set between TS3 and TS4.

Suppose that the current uplink-to-downlink time slot ratio is 3:3 and the system operating bandwidth is 10 MHz, it can be learned from Table 1 that the total resource necessary for transmitting the uplink control signaling in the reserved frequency resource, viz. the total amount of the uplink control signaling, is 24 PRB. With respect to the time domain positions of the reserved frequency resource, according to the principle of being fixedly assigned on all the uplink time slots and symmetrical and equal assignation, 4 PRB is assigned on both sides (4) of each of TS1, TS2, and TS3 in frequency domain respectively for the reserved frequency resource. The non-data associated control signaling (3) multiplex-transmitted together with the uplink data (2) is multiplexed before DFT.

Figure 7:
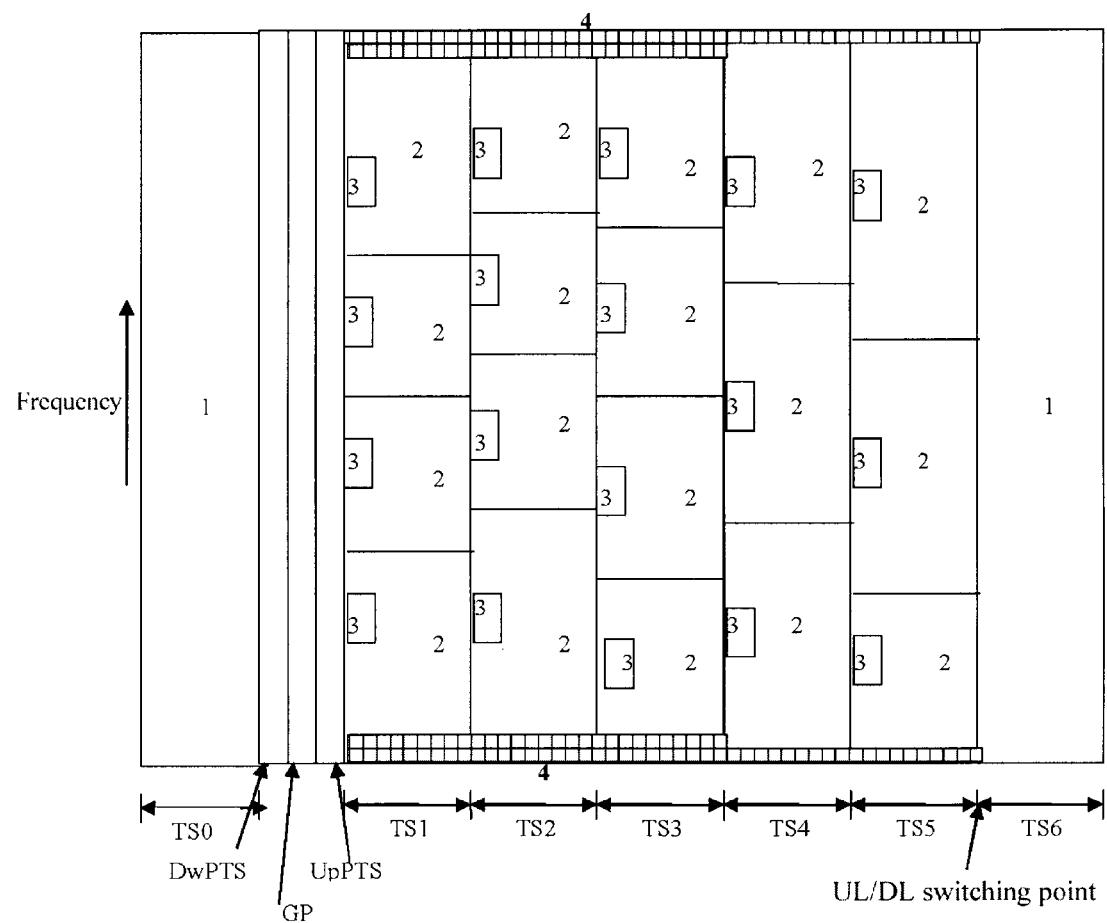
FIG. 7 is a schematic diagram of a third transmission solution for non-data associated control signaling transmitted together with data and individually transmitted non-data associated control signaling when the present invention is applied to TDD system adopting Alternative frame structure.

The third solution of reserving frequency resource: the time domain positions of the reserved frequency resource are fixedly assigned on all the uplink time slots (Alternative frame structure and Generic frame structure), i.e. a frequency resource is reserved in each time slot, but the bandwidths of the reserved frequency resource of the respective uplink time slots may be different. The bandwidth of the reserved frequency resource is dependent on the system operating bandwidth and the uplink-to-downlink time slot ratio. In the Alternative frame structure shown in FIG. 7, 1 represents downlink transmission channel, 2 represents uplink data channel, 3 represents non-data associated control signaling multiplex-transmitted together with data, and 4 represents individually transmitted non-data associated control signaling. TS0, TS6 are downlink transmission channels, TS1, TS2, TS3, TS4, TS5 are uplink transmission channels, and UL/DL switch-point is provided between TS5 and TS6.

Suppose that the current uplink-to-downlink time slot ratio is 5:1 and the system operating bandwidth is 20 MHz, it can be learned from Table 1 that the total resource necessary for transmitting the uplink control signaling in the reserved frequency resource, viz. the total amount of the uplink control signaling, is 16 PRB. According to the principle of being fixedly assigned in all the uplink time slots and symmetrical and equal assignation, 2 PRB is assigned on both sides (4) of TS1, TS2, and TS3 in frequency domain respectively for the reserved frequency resource, and 1 PRB is assigned on both sides (4) of TS4, TS5 in frequency domain for the reserved frequency resource.

During assignation, a possible assignation method is to assign two PRBs in minimum resource unit in each of the time slots from the uplink time slot of minimum number in increasing order of time slots, wherein each side of each time slot in frequency domain is respectively assigned with a PRB in minimum resource unit for uplink control signaling transmission, after assigning the last uplink time slot, continuously assign PRBs in minimum resource unit from the uplink time slot of the minimum number, till the resource necessary for all the uplink control signaling transmitted in the reserved frequency resource are assigned completely. After a first round of the assignation, 10 PRBs in minimum unit are assigned for TS1 to TS5, the rest 6 PRBs in minimum unit are assigned again in increasing order of time slot index, wherein two PRBs in minimum resource unit are assigned in each time slot in turn from the time slot TS1 of the minimum time slot index, i.e. both sides of each time slot in frequency domain are also assigned with a PRB in minimum unit respectively, so that the result of assignation as shown in FIG. 5 is formed: each side of TS1, TS2, TS3 in frequency domains is assigned with 2 PRBs in minimum unit, and each side of TS4, TS5 in frequency domains is assigned with 1 PRB in minimum unit. (3) multiplex-transmitted together with the uplink data (2) is multiplexed before to DFT.

During implementing this solution, it is also allowed to assign two PRBs in minimum unit in each time slot from the time slot of any time slot index in sequence, it is also allowed to assign two PRBs in minimum unit in each time slot in reduction order of time slot index.

The fourth solution of reserving frequency resource: the time domain positions of the reserved frequency resource are fixedly assigned in part of the uplink time slots (Alternative frame structure and Generic frame structure), i.e. a frequency resource is reserved in each uplink time slot of said part, and the reserved frequency resource of the respective uplink time slots have the same bandwidth. The bandwidth of the reserved frequency resource is dependent on the system operating bandwidth and the uplink-to-downlink time slot ratio. In the Alternative frame structure shown in FIG. 8, 1 represents a downlink transmission channel, 2 represents a uplink data channel, 3 represents a non-data associated control signaling multiplex-transmitted together with data, and 4 represents individually transmitted non-data associated control signaling. TS0, TS4, TS5, TS6 are downlink transmission channels, TS1, TS2, TS3 are uplink transmission channels, an UL/DL switch-point is provided between TS3 and TS4, and the time domain positions of the reserved frequency resource are fixedly assigned in part of the time slots TS1, TS2.

Suppose that the current uplink-to-downlink time slot ratio is 3:3 and the system operating bandwidth is 10 MHz, it can be learned from Table 1 that the total resource necessary for the uplink control signaling transmitted in the reserved frequency resource, viz. the total amount of the uplink control signaling is 24 PRB. According to the principle of being fixedly assigned in all the uplink time slots and symmetrical and equal assignation, 6 PRB is assigned for reserved frequency resource on each of the both sides (4) of each of TS1, TS2 in frequency domain.

The time domain positions for the reserved frequency resource are part of uplink time slots, which is determined by the maximum number of time slots used the reserved bandwidth assigned by the system, such as 2 or 3, and it is 2 in this embodiment. When the number of uplink time slots increases to exceed the maximum number of time slots, such as 2, the reserved frequency resource is not assigned to the newly added uplink time slot, instead, the newly added uplink control signaling is assigned into the time slots TS1, TS2 having been assigned with reserved frequency resource, i.e. the bandwidth of the assigned reserved frequency resource is extended, and all the reserved frequency resource have the same bandwidth. In this solution, the time domain positions of the reserved frequency resource are part of the uplink time slots, thus, the solution 1 may be considered as a special example of this solution, i.e. part of the uplink time slots is only one time slot. In addition, the time domain positions of the reserved frequency resource are fixedly assigned at part of the uplink time slots, and these uplink time slot indexes may either be successive or be incoherent.

The fifth solution for reserving frequency resource: the time domain positions of the reserved frequency resource are fixedly assigned at part of the uplink time slots (Alternative frame structure and Generic frame structure), i.e. a frequency resource is reserved in each uplink time slot of said part, but the bandwidths of the reserved frequency resource of said part of the uplink time slots may be different. The bandwidth of the reserved frequency resource is dependent on the system operating bandwidth and the uplink-to-downlink time slot ratio. In the Alternative frame structure shown in FIG. 9, 1 represents a downlink transmission channel, 2 represents a uplink data channel, 3 represents a non-data associated control signaling multiplex-transmitted together with data, and 4 represents individually transmitted non-data associated control signaling. TS0, TS4, TS5, TS6 are downlink transmission channels, TS1, TS2, TS3 are uplink transmission channels, and an UL/DL switch-point is set between TS3 and TS4, and the reserved frequency resource are fixedly located at part of the time slots TS1, TS2 in time domain.

Suppose that the current uplink-to-downlink time slot ratio is 3:3 and the system operating bandwidth is 2.5 MHz, it can be learned from Table 1 that the total resource necessary for transmitting the uplink control signaling in the reserved frequency resource, viz. the total amount of the uplink control signaling, is 6 PRB. The maximum number of time slots used by the reserved bandwidth assigned by the system is 2, i.e. only the former two uplink time slots TS1 and TS2 are used, and according to the principle of being fixedly assigned in part of the uplink time slots and symmetrical and equal assignation, 2 PRB is assigned at both sides (4) of TS1 in frequency domain for reserved frequency resource, and 1 PRB is assigned at both sides (4) of TS2 in frequency domain for reserved frequency resource.

The reserved frequency resource are located at part of the uplink time slots in time domain, which is also determined according to the maximum number of time slots used by the reserved bandwidth assigned by the system, when the number of uplink time slots increases to exceed the maximum number of time slots, the reserved frequency resource will not be assigned to the newly added uplink time slot, instead, all the newly added uplink control signaling are assigned to the time slots assigned with reserved frequency resource, i.e. the bandwidth of the assigned reserved frequency resource is extended.

Symmetrical and unequal assignation in the uplink time slots is implemented by assigning two PRBs in minimum resource unit in each of the time slots in increasing or reduction order of the time slot index from the uplink time slot of a number, wherein a PRB in minimum unit is assigned at each side of each time slot in frequency domain for uplink control signaling transmission, after assigning the last uplink time slot, continuously assign PRBs in minimum resource unit from the uplink time slot of the number, till the resource necessary for all the uplink control signaling transmitted in the reserved frequency resource is assigned completely. In the solution 5, the reserved frequency resource are fixedly assigned in part of the uplink time slots in time domain, the numbers of these uplink time slots may either be successive or be incoherent.

The above mentioned five solutions for reserving frequency resource (the solutions of reserving frequency resource generally can be divided into two types: the reserved frequency resource are fixedly assigned in all the uplink time slots and fixedly assigned in part of the uplink time slots, each type may further include various specific embodiments of equal and unequal assignation) are all usable for TDD system adopting Alternative frame structure and for TDD system adopting Generic frame structure, wherein the reserved frequency resource are all assigned based on the position of the switch-point, viz. the uplink-to-downlink time slot ratio and the system operating bandwidth. In FIG. 10, a TTD system adopting Generic frame structure is provided, #0, #1, #2 to #n−1 are uplink time slots, and #n to #19 are downlink time slots. Suppose that the condition in FIG. 10 is identical to that of the embodiment shown in FIG. 8, according to the current uplink-to-downlink time slot ratio and system operating bandwidth, assume that the total resource necessary for transmitting the uplink control signaling in the reserved frequency resource, viz. the total amount of the uplink control signaling, is 24 PRB, according to the principle of being fixedly assigned at part of the uplink time slots and symmetrical and equal assignation, 6 PRB is assigned at both sides (4) of the former two uplink time slots #0, #1 in frequency domain for reserved frequency resource. The non-data associated control signaling (2) multiplex-transmitted together with data (3) is transmitted within resource block assigned by each UE.

Another step of the method of the present invention is that the uplink control signaling is transmitted by an intra-sub-frame frequency hopping way on the reserved frequency resource, viz. the reserved control channel. In order to ensure the transmission quality of the uplink control signaling, the uplink control signaling individually transmitted in the reserved frequency resource is transmitted by an intra-sub-frame frequency hopping way, each UE or each group of UEs corresponding to a reserved control sub-channel, viz. a frequency-hop sequence.

The basic features for realizing frequency-hop sequence are:
1) frequency hopping is performed in a sub-frame (one sub-frame of the Alternative frame structure is a service time slot, and one sub-frame of the Generic frame structure is two time slots), the sub-frame is divided in time domain to form reserved control sub-channels, each reserved control sub-channel corresponding to a frequency-hop sequence, and the duration of the frequency-hop sequence occupies the entire sub-frame;

2) selection of the position of each control sub-channel in frequency domain should ensure the maximization of frequency diversity, and the single carrier characteristic of the uplink transmission should not be damaged, a frequency-hop sequence should correspond to two frequency resource having a distance as far as possible.

Figure 11:
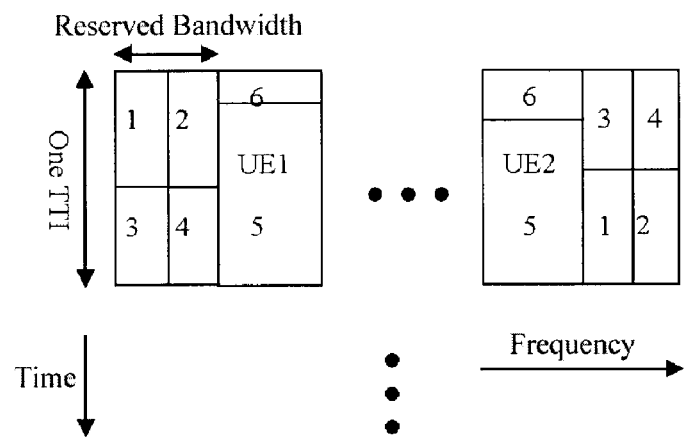
FIG. 11 is a schematic diagram of a solution in which the uplink control signaling of the present invention is transmitted on the reserved frequency resource by a frequency hopping way.

A schematic diagram of one realized solution is shown as FIG. 11, wherein a transmission time interval is provided in the Alternative frame-structure, the reserved bandwidths are located at both sides of the frame domain, there are 4 control sub-channels, 1 represents a control sub-channel 1, 2 represents a control sub-channel 2, 3 represents a control sub-channel 3, 4 represents a control sub-channel 4, 5 represents data, and 6 represents non-data associated control signaling transmitted together with data.

Figure 4:
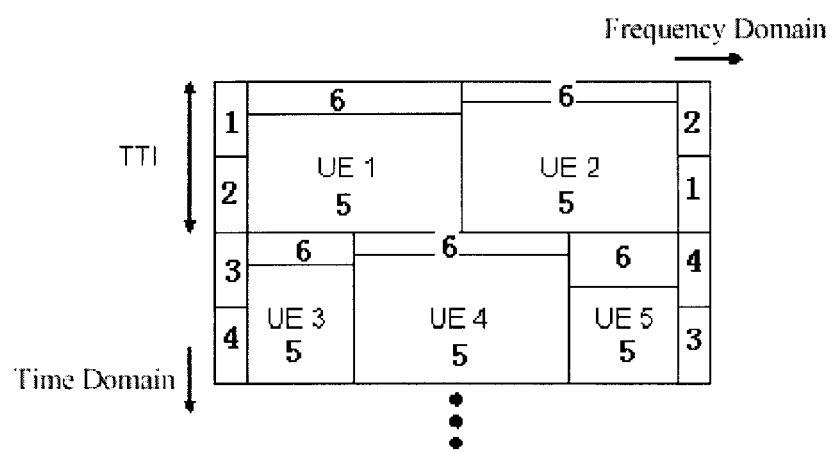
FIG. 4 is a schematic diagram of the solution for transmitting non-data associated control signaling transmitted together with data and individually transmitted non-data associated control signaling in LTE FDD.

Each control sub-channel can be assigned to a DE or be shared by a group of UEs. For instance, the control sub-channel 1 is assigned with frequency-hop sequence 1, in time domain, a sub-frame is divided into two segments, upper and lower segments, the duration occupies the entire sub-frame, viz. a TTI, to satisfy the coverage requirements; in frequency domain, two frequency-hop sequences 1 are assigned to two segments of frequency resource (both sides of the whole system bandwidth) having a distance as far as possible therebetween, so as to obtain maximum gain of frequency diversity. Similarly, the control sub-channel 2 is assigned with a frequency-hop sequence 2, the control sub-channel 3 is assigned with a frequency-hop sequence 3, the control sub-channel 4 is assigned with a frequency-hop sequence 4, and they all satisfy the principles of being divided into two segments and occupying the entire sub-frame, the two segments of each frequency-hop sequence occupying frequency resource apart from each other as far as possible in frequency domain. It should also be designed based on the above principle when exist multiple reserved uplink control sub-frames. For system adopting Generic frame structure, the uplink control signaling individually transmitted in the reserved frequency resource is transmitted by an intra-subframe frequency hopping way, which is similar with the solution of LTE FDD, particularly, see the assignation of frequency hopping in a sub-frame as shown in FIG. 4.

Figure 12:
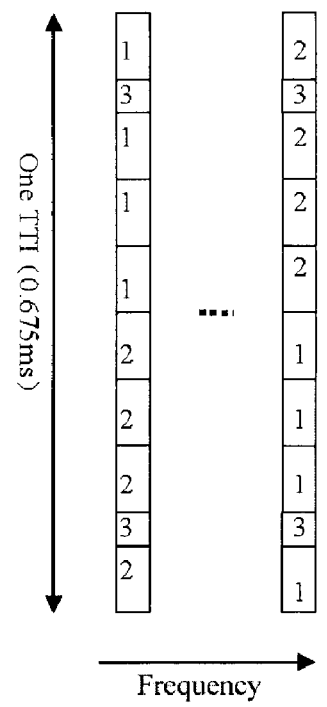
FIG. 12 is a schematic diagram of a first solution of inserting the pilot frequency into the reserved frequency resource in view of the uplink control channel with intra-subframe frequency hopping according to the present invention.
Figure 13:
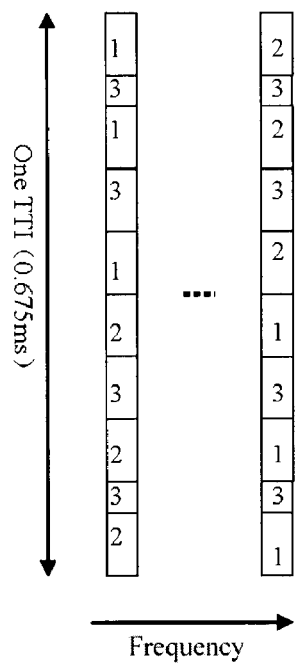
FIG. 13 is a schematic diagram of a second solution of inserting a pilot frequency into the reserved frequency resource in view of the uplink control channel with intra-subframe frequency hopping according to the present invention.
Figure 14:
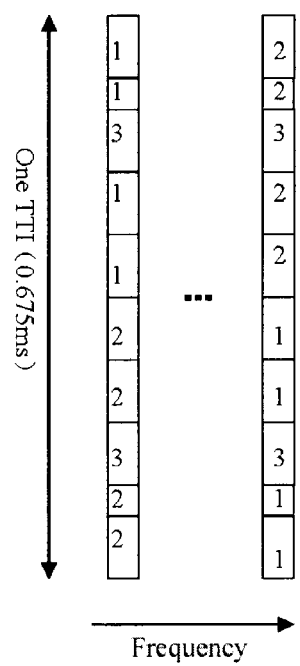
FIG. 14 is a schematic diagram of a third solution of inserting the pilot frequency into the reserved frequency resource in view of the uplink control channel with intra-subframe frequency hopping according to the present invention.

In addition, for the uplink control channel for hopping transmission, the present invention suggests that three different pilot structures, viz. three modes of pilot insertion are adopted to satisfy different requirements of quality of control signaling. FIG. 12 to FIG. 14 provide three solutions of inserting pilot symbol or reference symbol into each uplink frequency-hop sequence in LTE TDD system adopting Alternative frame structure. In the figures, 1 represents frequency-hop sequence 1, 2 represents frequency-hop sequence 2, and 3 represents a pilot symbol. For a system adopting Generic frame structure, the principle for inserting pilot symbol is identical thereto.

See FIG. 11, the frequency-hop sequence 1 and frequency-hop sequence 2 respectively occupy long blocks (LB) for frequency hopping transmission in the reserved frequency resource, and the pilot symbol 3 merely occupies two short blocks (SB), which is the same as the pilot insertion solution of normal data.

See FIG. 12, the frequency-hop sequence 1 and frequency-hop sequence 2 respectively occupy long blocks (LB) for frequency hopping transmission in the reserved frequency resource, and the pilot symbol 3 occupies two short blocks (SB), and two long blocks (LB) are added to send the pilot symbol 3.

Figure 1:
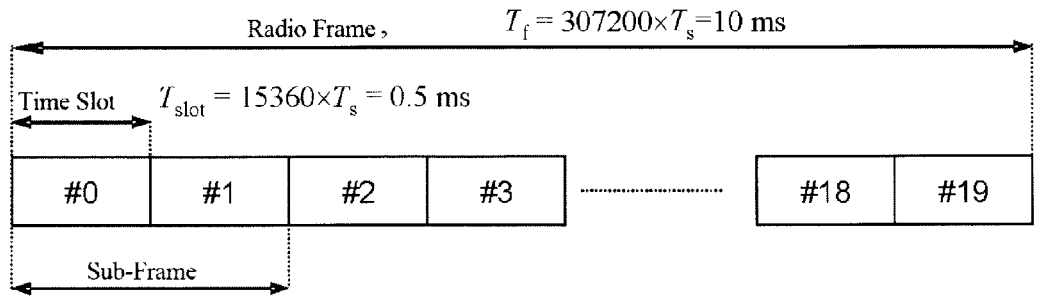
FIG. 1 is a schematic diagram of Generic frame structure for FDD and TDD.
Figure 2:
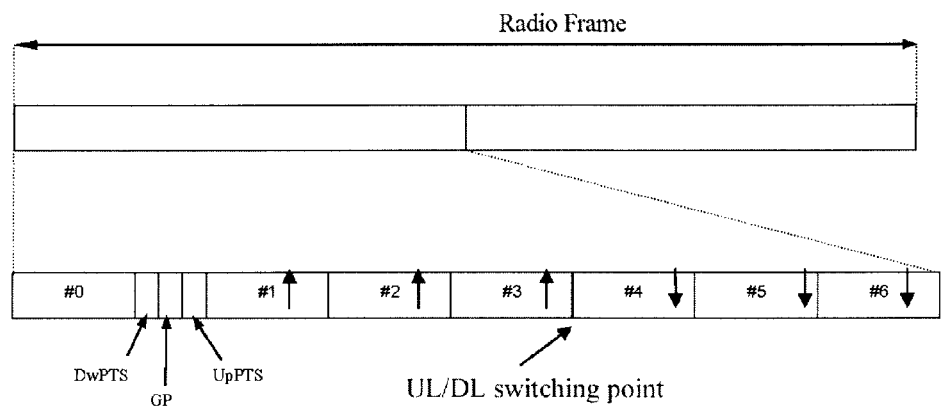
FIG. 2 is a schematic diagram of Alternative frame structure for TDD.
Figure 3:
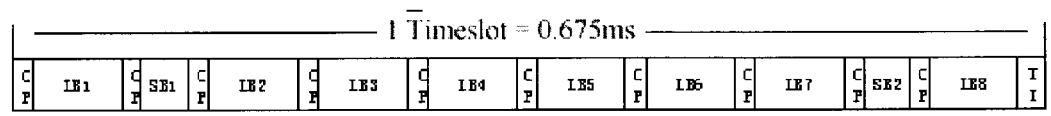
FIG. 3 shows a service time slot structure in the case of short CP.

See FIG. 3, the frequency-hop sequence 1 and frequency-hop sequence 2 are frequency hopping-transmitted in the reserved frequency resource, the pilot symbol 3 occupies two long blocks (LB), and the original short blocks (SB) are used for transmitting the uplink control signaling (frequency-hop sequence 1 and frequency-hop sequence 2).

An apparatus for uplink control signaling transmission in a time division duplex OFDMA system according to the present invention is used for individually transmitting non-data associated control signaling in a long term evolution time division duplex LTE TDD system, said apparatus comprises a control signaling processing unit and a frequency-hop processing unit. The control signaling processing unit processes information such as the uplink-to-downlink time slot ratio and the system operating bandwidth by communicating with the system, e.g. between NodeB and UE, to obtain the amount of reserved resource necessary for the uplink control signaling transmission, viz. the total amount of the uplink control signaling; processes and obtains the bandwidth of the reserved frequency resource, uplink time slot positions and frequency domain positions used by the reserved bandwidth based on the amount of reserved resource and the specific transmission solution, such as the number of uplink service time slots; assigns logic control channel to DE and maps the logic control channel into a physical control channel. The frequency-hop processing unit is used for processing real physical control channel. The uplink control signaling transmitted on the positions and bandwidth of the reserved frequency resource of the reserved uplink control channel is transmitted by an intra-subframe frequency hopping way on respective reserved uplink control sub-channel, the signaling of each UE or each group of UEs is transmitted in a frequency-hop sequence. Carrying out the frequency-hop sequence includes conducting time domain division under the condition that ensure the duration occupying the entire sub-frame and selecting frequency for each reserved control sub-channel under the condition of the maximization of the frequency diversity.

The following steps can explain the related processing procedures of the control signaling processing unit:

Step 1, determine the uplink-to-downlink time slot ratio, system operating bandwidth and the specific transmission solution by the system (e.g. NodeB), and conduct system information assignation, by a broadcasting way for instance;

Step 2, the control signaling processing unit processes and obtains the total amount of the reserved frequency resource necessary for individually transmitting the uplink control signaling, based on information such as the uplink-to-downlink time slot ratio and system operating bandwidth;

Step 3, the control signaling processing unit processes and obtains the uplink time slot positions and frequency domain positions used by the bandwidth of the reserved frequency resource, based on the total amount of reserved frequency resource sources and the specific transmission solution (e.g. the solution 1 for reserving frequency resource), viz. determining the specific parameters for the uplink control signaling transmission;

Step 4, the system (e.g. NodeB) informing UE the specific parameters for transmitting the uplink control signaling, such as the bandwidth of the reserved frequency resource, the used time slot positions and frequency domain positions as well as control channel mapping method, by a broadcasting way for instance;

Step 5, based on information such as downlink service, UE generating uplink control signaling, based on information such as ACK/NACK feedback information generated from a data service or CQI feedback information generated from a scheduling requirement, the system such as NodeB learns from the dispatching information that the UE has generated uplink control signaling transmission request, the request triggers the control signaling processing unit to assign specific physical control channel to the UE on the basis of Steps 1, 2, 3;

Step 6, the UE conducts assignation and mapping of the uplink control signaling according to received instruction such as instruction from the NodeB, and then the system such as NodeB can read the UE uplink control signaling from the specific physical control channel assigned to the UE.

Since the problem that the specific transmission solution for individually transmitting non-data associated control signaling is not proposed in current LTE TDD system, the present invention suggests a complete solution, which designs the transmission solution of the uplink control channel according to the characteristics of the LTE TDD system, and has the following advantages: the position and bandwidth of the reserved uplink control channel are variable and are assigned flexibly according to different positions of the UL/DL switch-point and different system operating bandwidths, which can improve the efficiency for utilizing resource and realize the unity of the uplink control channel; uplink control signaling is transmitted by an intra-subframe frequency hopping way on the reserved uplink control channel, which can obtain time domain and frequency domain diversities at the same time, so that the reliability of the control channel is improved; the present invention suggests multiple assignation methods for reserving uplink control channel, viz. reserving bandwidth, which can satisfy different application requirements and realize the unity of uplink control channel; in consideration of the uplink control channel transmitted by a frequency hopping way, multiple different pilot structures for inserting pilot symbol are suggested, so that suitable pilot solution can be selected to meet different requirements on service quality and channel conditions.

All the above mentioned are only preferable embodiments of the present invention, and shall not be construed as limiting the protection scope of the present invention.

What is claimed is:

1. A method for uplink control signaling transmission in a TDD OFDMA system, which is used for individually transmitting non-data associated control signaling in a LTE TDD system, wherein the method comprises the following steps:
    A. based on the total amount of the uplink control signaling and available uplink time slots, frequency resource being reserved for uplink control channel transmission, which is within the system bandwidth and adjacent to the upper limit and lower limit of the system bandwidth so as to form a reserved uplink control channel;
    B. the uplink control signaling, which is transmitted on the reserved frequency resource for uplink control channel transmission, being transmitted by an intra-subframe frequency hopping way on the reserved uplink control channel, and a frequency-hop sequence corresponding to the signaling of each terminal UE or a group of UEs;
        wherein, in the step B, transmitting on the reserved uplink control sub-channel by an intra-subframe frequency hopping way includes:
            dividing the sub-frame in time domain, each of the reserved uplink control sub-channels corresponding to a time-successive frequency-hop sequence, wherein the frequency-hop sequence continuously occupying the entire sub-frame in time domain, each frequency-hop sequence being assigned on two segments of frequency resource having a distance as far as possible in frequency domain.

2. The method for uplink control signaling transmission in a TDD OFDMA system according to claim 1, wherein, in the step A, forming the reserved uplink control channel includes:
    A1. extracting uplink-to-downlink time slot ratio and system operating bandwidth, acquiring the total amount of the uplink control signaling need to be transmitted on the reserved frequency resource;
    A2. determining the uplink time slots used to carry the reserved frequency resource of uplink control channel based on the uplink time slot resource;
    A3. assigning the uplink control signaling on both sides of frequency resource of the used uplink time slots.

3. The method for uplink control signaling transmission in a TDD OFDMA system according to claim 2, wherein,
    in the step B, the transmitting on the respective reserved uplink control sub-channels by an intra-subframe frequency hopping way includes:
    dividing the sub-frame in time domain, each of the reserved uplink control sub-channels corresponding to a time-successive frequency-hop sequence, the frequency-hop sequence continuously occupying the entire sub-frame in time domain, each frequency-hop sequence being assigned on two segments of the frequency resource having a distance as far as possible in frequency domain.

4. The method for uplink control signaling transmission in a TDD OFDMA system according to claim 2, wherein, in the step A2, the uplink time slots used by the reserved bandwidth are determined to be all the uplink time slots in a frame structure; in the step A3, the uplink control signaling is symmetrically assigned on both sides of the frequency resource of all the used uplink time slots.

5. The method for uplink control signaling transmission in a TDD OFDMA system according to claim 4, wherein, in the step A3, all the uplink control signaling can be averagely or unequally in time domain and symmetrically in frequency domain assigned on both sides of the frequency resource of all the used uplink time slots.

6. The method for uplink control signaling transmission in a TDD OFDMA system according to claim 5, wherein, in the step A3, all the uplink control signaling being assigned unequally in time domain and symmetrically in frequency domain comprises: starting with a certain time slot, reserving a minimum resource unit on each side of each time slot in frequency domain, then repeating the operation on next time slot in an increasing or reduction order of the time slot index; after assigning the last uplink time slot, continuously assigning from the certain time slot, till all the uplink control signaling is assigned completely.

7. The method for uplink control signaling transmission in a TDD OFDMA system according to claim 2, wherein, in the step A2, the uplink time slot used by the reserved bandwidth is determined to be part of the uplink time slots in the frame; in the step A3, the uplink control signaling is symmetrically assigned on both sides of the frequency resource of the used uplink time slots.

8. The method for uplink control signaling transmission in a TDD OFDMA system according to claim 7, wherein, in the step A2, the uplink time slot used by the reserved bandwidth is fixedly assigned on any uplink time slot in the frame; in the step A3, all the uplink control signaling is equally assigned on both sides of the frequency resource of the used uplink time slot.

9. The method for uplink control signaling transmission in a TDD OFDMA system according to claim 7, wherein, in the step A2, the part of the uplink time slots are determined in accordance with the maximum number of reserved time slots assigned in the system; in the step A3, when the number of the uplink time slots increases to exceed the maximum number of reserved time slots, assigning the newly added uplink control signaling on both sides of the frequency resource of the time slots to which reserved frequency resource has been assigned, and assigning no reserved frequency resource to the newly added uplink time slot.

10. The method for uplink control signaling transmission in a TDD OFDMA system according to claim 7, wherein, in the step A3, all the uplink control signaling is averagely or unequally in time domain and symmetrically in frequency domain assigned on both sides of the frequency resource of the used uplink time slots.

11. The method for uplink control signaling transmission in a TDD OFDMA system according to claim 10, wherein, in the step A3, the unequally symmetrical assignment of the uplink control signaling comprises: starting with a time slot of a certain uplink time slot index, assigning a minimum resource unit on each side of each time slot in frequency domain, then repeating the operation on next time slot in the increasing or reduction order of the time slot index; after assigning the last uplink time slot, continuously assigning from the time slot of the certain time slot, till all the uplink control signaling is assigned completely.

12. The method for uplink control signaling transmission in a TDD OFDMA system according to claim 1, wherein the step B further includes inserting a pilot symbol into the frequency-hop sequence, the inserted pilot symbol occupying two short blocks; or
    inserting a pilot symbol into the frequency-hop sequence, the inserted pilot symbol occupying the two short blocks and occupying two long blocks; or
    inserting a pilot symbol into the frequency-hop sequence, the inserted pilot symbol occupying the two long blocks, and the two short blocks also transmitting the uplink control signaling.

13. An apparatus for uplink control signaling transmission in a TDD OFDMA system, which is used for individually transmitting non-data associated control signaling in a LTE TDD system,
    comprising a control signaling processing device and a frequency-hop processing device;
the control signaling processing device reserving frequency resource for uplink control channels and assigning the reserved frequency resource, which is within the system bandwidth and adjacent to the upper limit and lower limit of the system bandwidth in frequency domain, based on all uplink control signaling and available uplink time slot resource, so as to form reserved uplink control channels;
the frequency-hop processing device transmitting the uplink control signaling, which is transmitted on the reserved frequency resource for uplink control channel transmission, by an intra-subframe frequency hopping way on the respective reserved uplink control sub-channels, and a frequency-hop sequence corresponding to the signaling of each terminal UE or a group of UEs; and
wherein the frequency-hop processing device transmitting the uplink control signaling on the respective reserved uplink control sub-channels by the intra-subframe frequency hopping way, including: dividing the sub-frame in time domain, each of the reserved uplink control sub-channels corresponding to a time-successive frequency-hop sequence, the frequency-hop sequence continuously occupying the entire sub-frame in time domain, each frequency-hop sequence being assigned on two segments of frequency resource having a distance as far as possible in frequency domain.

14. The apparatus for uplink control signaling transmission in a TDD OFDMA system according to claim 13, wherein the processing of the control signaling processing device reserving frequency resource for the uplink control channel includes: extracting the uplink-to-downlink time slot ratio and system operating bandwidth from system assignation information, acquiring the total amount of the uplink control signaling need to be transmitted in the reserved frequency resource; determining uplink time slots used by the reserved frequency resource based on the uplink time slot resource; assigning all the uplink control signaling to used uplink time slots on both sides of frequency resource of the used uplink time slots.

15. The apparatus for uplink control signaling transmission in a TDD OFDMA system according to claim 13, wherein the control signaling processing device reserving frequency resource for the uplink control channel includes: extracting the uplink-to-downlink time slot ratio and system operating bandwidth from system assignation information, acquiring the total amount of the uplink control signaling need to be transmitted on the reserved frequency resource; determining uplink time slots used by the reserved frequency resource according to the uplink time slot resource; assigning the uplink control signaling on both sides of the frequency resource of the used uplink time slots;
    the frequency-hop processing device transmitting the uplink control signaling on the respective reserved uplink control sub-channels by an intra-subframe frequency hopping way, including: dividing the sub-frame in time domain, each of the reserved uplink control sub-channels corresponding to a time-successive frequency-hop sequence, the frequency-hop sequence continuously occupying the entire sub-frame in time domain, and each frequency-hop sequence being assigned on two segments of frequency resource having a distance as far as possible in frequency domain.

16. The apparatus for uplink control signaling transmission in a TDD OFDMA system according to claim 14, wherein the frequency-hop processing device further inserting a pilot symbol into the frequency-hop sequence, the inserted pilot symbol occupying two short blocks; or
    the frequency-hop processing device further inserting a pilot symbol into the frequency-hop sequence, the inserted pilot symbol occupying two short blocks and occupying two long blocks; or
    the frequency-hop processing device further inserting a pilot symbol into the frequency-hop sequence, the inserted pilot symbol occupying two long blocks, and two short blocks transmitting the uplink control signaling.

17. The method for uplink control signaling transmission in a TDD OFDMA system according to claim 3, wherein the step B further includes inserting a pilot symbol into the frequency-hop sequence, the inserted pilot symbol occupying two short blocks; or
    inserting a pilot symbol into the frequency-hop sequence, the inserted pilot symbol occupying the two short blocks and occupying two long blocks; or
    inserting a pilot symbol into the frequency-hop sequence, the inserted pilot symbol occupying the two long blocks, and the two short blocks also transmitting the uplink control signaling.

18. The apparatus for uplink control signaling transmission in a TDD OFDMA system according to claim 13, wherein the frequency-hop processing unit device further inserting a pilot symbol into the frequency-hop sequence, the inserted pilot symbol occupying two short blocks; or the frequency-hop processing device further inserting a pilot symbol into the frequency-hop sequence, the inserted pilot symbol occupying two short blocks and occupying two long blocks; or the frequency-hop processing device further inserting a pilot symbol into the frequency-hop sequence, the inserted pilot symbol occupying two long blocks, and two short blocks transmitting the uplink control signaling.

* * * * *

UNITED STATES PATENT AND TRADEMARK OFFICE
CERTIFICATE OF CORRECTION

| | | |
|---|---|---|
| PATENT NO. | : 8,213,345 B2 | Page 1 of 1 |
| APPLICATION NO. | : 12/532271 | |
| DATED | : July 3, 2012 | |
| INVENTOR(S) | : Suo et al. | |

It is certified that error appears in the above-identified patent and that said Letters Patent is hereby corrected as shown below:

Title Page, Item [57]/Abstract:

Now reads: "simple to realizes and"

Should read: -- simple to realize and --

In the Specifications:

Column 4, line 30:

Now reads: "the reserved frequency resource are"

Should read: -- the reserved frequency resource is --

Column 4, line 50:

Now reads: "by a intra-subframe"

Should read: -- by an intra-subframe --

Column 11, line 21:

Now reads: "assigned to a DE or"

Should read: -- assigned to a UE or --

Signed and Sealed this
Twenty-third Day of July, 2013

Teresa Stanek Rea
*Acting Director of the United States Patent and Trademark Office*